United States Patent Office 3,525,781
Patented Aug. 25, 1970

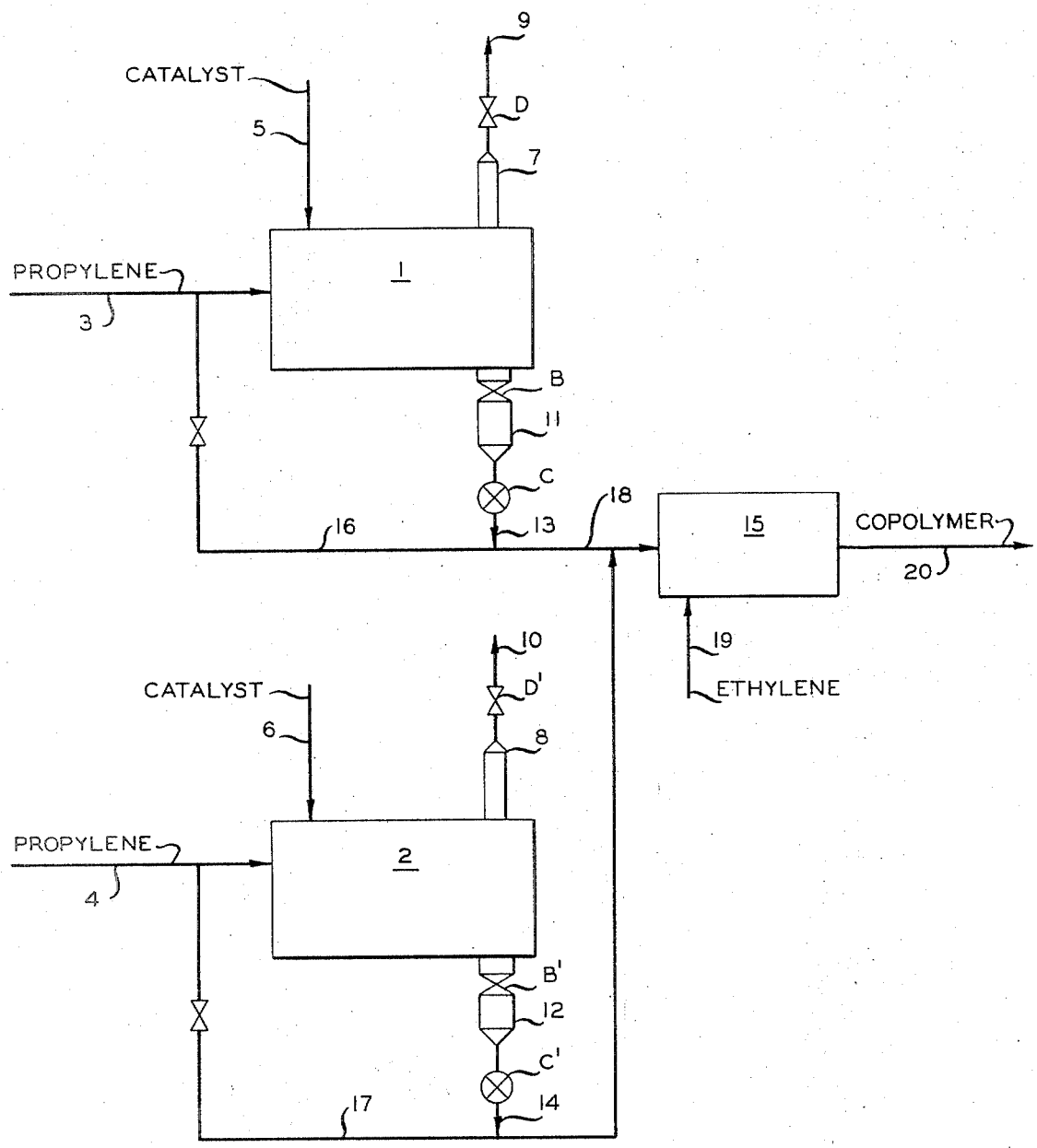

3,525,781
BLOCK COPOLYMERS PREPARED BY FEEDING BATCH PREPOLYMER INTO A CONTINUOUS REACTOR
Jack S. Scoggin, Bartlesville, Okla., assignor to Phillips Petroleum Company, a corporation of Delaware
Filed May 17, 1965, Ser. No. 456,092
Int. Cl. C08f 15/04
U.S. Cl. 260—878
10 Claims

ABSTRACT OF THE DISCLOSURE

Continuous polymerization process employing at least two batch reaction zones and utilizing the polymer formed therein to continuously feed a subsequent, continuous polymerization zone.

This invention relates to a method and apparatus for forming a copolymer.

Although this invention will, for the sake of clarity, be described with reference to the polymerization of propylene and ethylene, it should be noted at the outset that this invention is broadly applicable to mono-1-olefins as described hereinafter and combinations thereof.

Heretofore copolymers of propylene and ethylene, e.g., such as mixed block and random copolymers and block copolymers, which are homogeneous as to appearance, i.e., are of a uniform coloration throughout and have a substantially complete absence of lighter or darker areas therein, have been made by batch processes wherein the propylene is first polymerized to a certain extent and then the ethylene is added to the same batch reactor to form the copolymer. Since this system suffers from the inertia inherent in a batch operation, continuous systems, for example a first continuous reactor wherein propylene is polymerized and which feeds a second continuous reactor in which ethylene is copolymerized with the polypropylene from the first reactor, were tried. However, continuous copolymerization systems at present have not consistently produced a copolymer having as uniform an appearance as the copolymer obtained from a batch operation.

It has now been found that a copolymer which has a uniform appearance, i.e., at least on a par with a copolymer produced by a batch operation, can be continuously formed, by batch, particle form polymerizing the mono-1-olefin in at least one batch reaction zone and utilizing the polymer so formed to continuously feed a continuous polymerization zone wherein the polymer is copolymerized with another mono-1-olefin.

It has also been found that higher productivity of the catalyst employed and a lower catalyst removal cost than heretofore realized can be effected if the polymer in the batch reaction zone is concentrated or collected in a localized subzone and then passed from that subzone into the continuous reaction zone. By employing the subzone aspect of this invention that part of the catalyst which has not been utilized to form polypropylene will be retained in the reaction zone while substantially all the catalyst that has been utilized to form polypropylene is passed from the batch reaction zone into the continuous reaction zone. This procedure leaves unutilized catalyst in the batch reaction zone and lowers the amount of catalyst passed into the continuous reaction zone which must subsequently be removed.

Utilization of the subzone also results in higher propylene conversion in the batch reaction zones and less make-up of propylene to those zones than operation without a subzone. Since less propylene per unit of product is fed to the reaction zones, less catalyst poisons are fed to those zones and therefore results in high catalyst productivity.

The apparatus necessary for carrying out this invention comprises at least one batch reactor having associated therewith at least one substantially vertical settling leg or zone openly connected to the underside of the reactor. The polypropylene is collected in this leg or zone and is passed therefrom into the continuous polymerization reactor.

Accordingly, it is an object of this invention to provide a new and improved method for forming a copolymer. It is another object of this invention to provide new and improved apparatus for forming a copolymer.

Other aspects, objects, and the several advantages of the invention will be readily apparent to those skilled in the art from the description, the drawing, and the appended claims.

In the drawing there is diagrammatically shown a system embodying this invention.

More specifically, there is shown two batch reactors 1 and 2 to which propylene is fed through lines 3 and 4, respectively. Hydrogen can be added to lines 3 and 4 if desired. Catalyst is added through lines 5 and 6. Each reactor has associated therewith an inverted settling leg 7 and 8 and a valved line 9 and 10 through which flush propylene which is continuously admitted to the reactors to maintain mechanisms internal of the reactors free of polypropylene can be withdrawn.

Settling zones or legs 11 and 12 and associated rotary lock valved conduits 13 and 14 collect the polypropylene particles formed in the reactors prior to removal of that polypropylene to continuous reactor 15. Valves B and B' in legs 11 and 12 are adapted to close off communication between the legs and their reactors. Polypropylene is carried to reactor 15 from reactors 1 and 2 by valved lines 16 and 17 with propylene from lines 3 and 4. The polypropylene carried by propylene is carried by line 18 into reactor 15 and into contact with a continuous stream of ethylene introduced into reactor 15 by line 19. The propylene-ethylene copolymer formed in 15 is removed therefrom by line 20 for removal of the catalyst and other subsequent treatment and disposition as desired.

According to this invention a first mono-1-olefin monomer having from 2 to 8 carbon atoms per molecule, inclusive, is polymerized in one batch reactor with its valve B closed to form polymer particles while other polymer particles are removed from the settling leg of the other reactor with its valve B open. The removed polymer particles are passed together with additional first mono-1-olefin monomer into the continuous reactor. In the continuous reactor the polymer particles and first mono-1-olefin monomer are contacted with a second mono-1-olefin monomer, having from 2 to 8 carbon atoms per molecule, inclusive, to form a copolymer of the two olefin monomers. Although the batch polymerization is carried out with a catalyst and under conditions such that solid particle polymer is formed, the continuous polymerization reaction can be carried out under conditions in which either solid or soluble copolymer is formed. Also, although the invention has been disclosed utilizing bulk polymerization, i.e., utilizing the monomer itself as a diluent, the polymerization can be carried out in both the batch and continuous polymerization reactions in the presence of an extraneous diluent such as n-hexane or cyclohexane and the like is desired. Also, copolymers of more than two monomers can be formed by this invention by introducing into reactor 15 two or more monomers.

In the operation of this invention polymerization is carried out for a period of, for example, 2 to 4 hours with the valve B closed. Valve B is then opened and polymer is continuously removed through rotary lock C while fresh monomer is admitted to the reactor. When the polymer is depleted from the reactor, valve B is closed and fresh catalyst admitted to the reactor.

Although mono-1-olefins having from 2 to 8 carbon atoms per molecule can be employed, it is preferred to employ mono-1-olefins containing from 2 to 4 carbon atoms per molecule. Examples of suitable mono-1-olefins include ethylene, propylene, 1-butene, 1-pentene, 3-methyl-1-butene, and the like.

The conditions employed in conducting the polymerization reactions will vary widely depending upon the mono-1-olefin utilized. Generally, the polymerization temperature is in the range of from about 0 to about 160° F. In the polymerization of ethylene, a temperature in the range of about 0 to about 45° F. is usually employed. In the case of propylene, a temperature in the range of from about 90 to about 160° F. is usually employed. When polymerizing a higher olefin, such as 1-butene, a lower polymerization temperature is used, e.g., 86° F. or lower. In the polymerization of olefins containing about 5 carbon atoms and higher, still somewhat lower temperatures are utilized, e.g., about 75° F. or lower. In general, the batch polymerization reaction is carried out at a temperature such that solid polymer in particle form is obtained.

The pressure employed in both polymerization reactions should be that sufficient to maintain the reactants in a liquid phase, e.g., a pressure in the range of about 275 to about 1000 p.s.i.g. The maximum pressure employed is limited only by practical considerations, although generally it is undesirable to exceed a pressure of 2000 p.s.i.g. When polymerizing ethylene the lower limit of pressure is about 425 p.s.i.g. at a polymerization temperature of about 0° F. In the case of the polymerization of propylene, the lower limit of pressure is about 225 p.s.i.g. at a polymerization temperature of about 90° F.

The batch polymerization reaction is generally carried out substantially to completion before the polymer is removed and passed to the continuous polymerization reaction zone. Although the time required for achieving substantially complete polymerization can vary widely depending upon the monomer being polymerized, the polymerization conditions and the like, from about ½ to about 5, preferably from about 2 to about 4, hours are sufficient.

Since a wide variety of catalyst systems can be employed in the polymerization, it is not intended to limit the invention to any particular catalyst system. Catalyst systems suitable for use in this invention are those which are capable of polymerizing a mono-1-olefin in both a batch and a continuous polymerization system and under conditions such that solid polymer in particle form is produced at least in the batch system. Catalyst systems suitable for use can be broadly defined as comprising an organometal compound and a metal salt. A particularly suitable catalyst is one which comprises (a) a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, $n$ is from 1 to 3, inclusive, $m$ is from zero to 2, inclusive, and the sum of $m$ and $n$ is equal to the valence of the metal M, and (b) a halide of a metal of Group IV–B, V–B, VI–B or VIII (Periodic Table of Elements, Handbook of Chemistry and Physics, Chemical Rubber Company, 45th edition, 1964, p. B–2). The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr$ (Benzene derivative), $C_{20}H_{41}GaBr_2$, $(C_{14}H_{29})_2GaF$, $(C_6H_5)_2InCl$ (benzene derivative), $$C_8H_{17}InF_2$$

$(C_6H_{11})InBr_2$ cyclohexane derivative), 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like. Mixtures of these materials, such as a mixture of diethylaluminum chloride and ethylaluminum dichloride, etc., can also be employed.

The metal halide component of the catalyst system is preferably a halide of a Group IV–B metal, i.e., titanium, zirconium, hafnium, and germanium. The trichlorides, trifluorides, tribromides, and triiodides, as well as the tetrachloride, tetrafluorides, tetrabromides and tetraiodides of the group IV–B metals, can be used in the catalyst system, either individually or as mixtures of two or more of the metal halides. It is usually preferred to employ a trichloride, such as titanium trichloride, in the polymerization. However, it is to be understood that halides of metals of the other groups specified above, such as vanadium, molybdenum, tungsten, cobalt, and iron can also be employed in the catalyst system.

The preferred catalyst system employed in the polymerization comprises a dialkylaluminum chloride, such as diethylaluminum chloride, and titanium trichloride, the latter compound preferably being prepared by reduction of titanium tetrachloride in the presence of aluminum. The reduction product is preferably a complex having the approximate formula $3TiCl_3 \cdot AlCl_3$. The reduction reaction is usually carried out at an elevated temperature, for example at a temperature in the range of 360 to 600° F., preferably from 375 to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols/mol. When employing the preferred catalyst system, the mol ratio of the dialkylaluminum halide to the titanium trichloride complex usually ranges from 1.0:0.02 to 1.0:50.0, preferably 1.0:0.1 to 1.0:10.0. The amount of the dialkylaluminum halide used is at least $1.0 \times 10^{-4}$ gm./gm. of monomer and can be as much as $25 \times 10^{-4}$ gm./gm. of monomer. The amount of titanium trichloride employed is generally in the range of $1.5 \times 10^{-4}$ to $10 \times 10^{-4}$ gm./gm. of monomer.

The proportion of the batch polymerized polymer, i.e., polypropylene, and the continuously polymerized polymer, i.e., polyethylene in the final product can be varied widely. Generally, the predominantly polyethylene portion constitutes 10 to 50, preferably 15 to 25, percent by weight of the final product.

The catalyst can be removed from the copolymer in a conventional manner such as by the use of acetylacetone and propylene oxide as is fully and completely disclosed in copending U.S. patent application 174,002, filed Feb. 19, 1962, of the same inventor.

The settling leg or zone can vary widely in size and configuration, one primary requirement being that it be sufficient to collect and hold at least one batch of polymer produced by the reactor to which it is connected. The reactor itself can be tilted, baffled and the like to direct settling polymer particles into the settling zone. The flow of polymer particles out of the settling zone can be regulated in any conventional manner such as by the use of a rotary lock valve.

The time length for polymerizing a bath of polymer and allowing same to settle into the settling zone will vary widely, but will generally take from about 1 to about 6 hours. Thus, the capacity of the reactor and settling zone must be such that one batch can be polymerized and settled at least by the time another separate batch has been passed into the continuous reactor. In this way two batch reactors can be employed to continuously feed a single continuous reactor.

Although not completely understood and therefore not being desired to be bound thereby, it appears that the surprising color uniformity of the copolymers of this invention is, at least in part, attributable to the fact that the polypropylene is uniformly polymerized, i.e., the polymer chains are of substantially the same length, before the passage of same into the continuous polymerization zone. Such uniformity of polymerization does not appear to be achievable in a continuous polymerization zone since in such zones some of the catalyst passes through in an extremely short time, i.e., short circuits, while yet some other of the catalyst remains an unduly long time. Thus, the poylmerization product of such a zone will contain polymer chains that vary greatly from one another in the length thereof.

Block copolymers as used herein are those polymers wherein the chain is composed of alternating blocks of two or more monomer molecules. Random copolymers are those wherein the monomer molecules are randomly distributed throughout the chain. Mixed copolymers are those wherein the chain is composed of blocks of a monomer molecule associated with lengths of the chain in which the monomer molecules are randomly distributed.

If desired additional organometal reducing agent and/or hydrogen can be aded to the continuous polymerization zone to help maintain the polymerization reaction rate and to scavenge catalyst poisons.

It should also be noted that according to this invention the polymerization reaction in the batch reactors can be carried out to completion, i.e. substantially all of the first monomer consumed, before the polymer is transferred to the continuous reactor for copolymerization with the second monomer, thereby eliminating the need for adding additional first monomer to the polymer entering or to the continuous reactor. In this embodiment an extraneous diluent can be employed in the batch reactors and carried over into the continuous reactor. This diluent can be any material which is inert and liquid under the process conditions. Such diluents include paraffins, cycloparaffins, aromatic hydrocarbons and mixtures thereof. Examples of these diluents include hexane, heptane, isooctane, cyclohexane, methylcyclohexane, benzene, toluene and the like. By this process a block copolymer is formed without carrying the first monomer into the continuous reactor.

EXAMPLE

Reactor 1 is filled liquid full of propylene and catalyst addition initiated with valve B closed. Liquid propylene is continuously added to reactor 1 in an amount sufficient to maintain reactor pressure above the vapor pressure of propylene during the polymerization operation and to compensate for an increase in density of the reactor contents as the polymerization progresses. During polymerization approximately 500 pounds of propylene is removed through valved line 9 to allow adequate flushing of the reactor pumps, bearings and similar internal apparatus. After two to three hours of polymerization at a temperature of about 130° F. the polypropylene concentration in reactor 1 reaches about 35 weight percent and catalyst addition is terminated. Valve D in line 9 is closed, valve B is opened and rotary lock C is started. Propylene flow in line 16 is started and polypropylene is continuously fed to reactor 15 from leg 11 for two to three hours. Polypropylene which is displaced by additional propylene passing into reactor 1 settles continuously into leg 11 during the feeding period of reactor 15. Ethylene is added continuously to reactor 15 and a copolymer of polypropylene and polyethylene is continuously removed from reactor 15 by line 20. Polymerization reactor 15 is carried out at a temperature of about 60° F. Polypropylene residence time in reactor 15 is about 1⅛ times the residence time in reactor 1. When the polypropylene is depleted from reactor 1, valve B is closed, line 16 is shut off, and the polymerization cycle is repeated by the addition of more catalyst.

Since it takes approximately two to three hours to deplete the polypropylene in reactor 1, the polymerization cycle in reactor 2 is started at about the same time polypropylene is first started to be withdrawn from reactor 1. Thus, while one reactor is being depleted of its polypropylene content the other reactor is undergoing a polymerization operation so that a supply of polypropylene is always ready and polypropylene is continuously passed into reactor 15.

A material balance for a polymerization operation for one batch polypropylene reactor and the continuous ethylene reactor is as follows:

The polymer recovered in a conventional manner from the effluent of reactor 15 is highly uniform and has an appearance as uniform as a similar copolymer obtained from a solely batch type operation.

TABLE

| Material | Line 5 [1] (Catalyst) | Line 13 [1] (Polypropylene) | Line 16 (Propylene) | Line 19 [1] (Ethylene) | Line 20 [1] (Copolymer) | Line 9 (Propylene) | Line 3 [1] (Propylene) |
|---|---|---|---|---|---|---|---|
| Titanium trichloride | 4 | 4 | | | 4 | | |
| Triethylaluminum chloride | 3 | 3 | | | 3 | | |
| Propylene | | 8,000 | 91,000 | | 16,550 | 500 | 25,600 |
| Ethylene | | | | 3,460 | 1,820 | | |
| Hydrogen | | 1 | | | 1 | | 1 |
| Polymer | | 8,000 | | | 10,190 | | |
| Total | 7 | 16,008 | 91,000 | 3,460 | 28,568 | 500 | 25,600 |

[1] All numbers in pounds.

Reasonable variations and modifications are possible within the scope of this disclosure without departing from the spirit and scope of the invention.

I claim:

1. A continuous polymerization process comprising batch polymerizing under polymerization conditions such that solid particle polymer is formed, at least one first mono-1-olefin monomer, having from 2 to 8 carbon atoms per molecule, in at least two batch reaction zones, consecutively emptying said batch reaction zones into a separate continuous reaction zone, continuously copolymerizing the polymer formed by said batch polymerization with at least one second mono-1-olefin monomer, having from 2 to 8 carbon atoms per molecule, in said separate continuous reaction zone, and maintaining said continuous reaction zone under conditions of temperature and pressure sufficient to cause copolymerization of said polymer and the monomer present.

2. The method according to claim 1 wherein the polymer formed in said at least two batch reaction zones is collected in a subzone prior to being passed to the continuous reaction zones.

3. The method according to claim 2 wherein the batch polymerized first mono-1-olefin is propylene and said second mono-1-olefin is ethylene.

4. A continuous polymerization process comprising polymerizing under polymerization conditions such that solid particle polymer is formed, at least one first mono- 1-olefin having from 2 to 8 carbon atoms per molecule in at least two batch polymerization zones, consecutively transferring the polymer formed from said batch zones to a separate continuous polymerization zone, continuously adding to said continuous polymerization zone at least one second mono-1-olefin having from 2 to 8 carbon atoms per molecule, and maintaining said continuous polymerization zone under conditions of temperature and pressure sufficient to cause copolymerization of said polymer and the monomer present.

5. The method according to claim 4 wherein the polymer contents of each batch polymerization zone is settled into a subzone of each reactor prior to transferral of that polymer into said continuous polymerization zone.

6. The process according to claim 4 wherein the polymer is transferred to the continuous polymerization zone together with additional first mono-1-olefin.

7. The process according to claim 4 wherein the polymerization in the batch zone is carried out in the presence of an inert hydrocarbon diluent which is liquid under the process conditions and a mixture of polymer and diluent is transferred to the continuous polymerization zone.

8. The method according to claim 4 wherein a catalyst system comprising a dialkylaluminum chloride and titanium trichloride is employed in said polymerizing in said at least two batch polymerization zones.

9. A continuous polymerization process comprising polymerizing propylene in the range of from about 90 to about 160° F. in first and second batch polymerization zones for from about ½ to about 5 hours, allowing the polypropylene formed to settle out of each polymerization zone into a subzone of that polymerization zone, gradually removing the polypropylene from a subzone of the first batch reaction zone and mixing the so removed polypropylene with additional liquid propylene, continuously passing the mixture of propylene and polypropylene into a separate continuous reaction zone and therein contacting said mixture with ethylene at a temperature of from about 0 to about 45° F. for from about 1 to about 5 hours, removing the polypropylene from a subzone of the second batch reaction zone after the polypropylene has been substantially completely removed from the subzone of the first batch reaction zone and mixing the removed polypropylene with additional liquid propylene, passing said mixture into said continuous reaction zone so as to continuously supply polypropylene and propylene to said continuous reaction zone, and thereafter alternately forming new batches of polypropylene in said first and second batch reaction zones while the subzones of these batch reaction zones are alternately emptied into said continuous reaction zone.

10. A continuous polymerization process comprising polymerizing propylene in the range of from about 90 to about 160° F. in first and second batch polymerization zones until substantially all of the propylene is consumed and in the presence of an inert hydrocarbon diluent which is liquid under the process conditions, allowing the polypropylene formed to settle out of each polymerization zone into a subzone of that polymerization zone, gradually removing the polypropylene and at least part of said diluent from a subzone of the first batch reaction zone, continuously passing the mixture of diluent and polypropylene into a separate continuous reaction zone and therein contacting said mixture with ethylene at a temperature from about 0 to about 45° F. for from about 1 to about 5 hours, removing the polypropylene and at least part of the diluent from a subzone of the second batch reaction zone after the polypropylene has been substantially completely removed from the subzone of the first batch reaction zone, passing said mixture into said continuous reaction zone so as to continuously supply polypropylene to said continuous reaction zone, and thereafter alternately forming new batches of polypropylene in said first and second batch reaction zones while the subzones of these batch reaction zones are alternately emptied into said continuous reaction zone.

References Cited

UNITED STATES PATENTS

| | | | |
|---|---|---|---|
| 3,284,430 | 11/1966 | Forman et al. | 260—94.2 |
| 3,345,431 | 10/1967 | Harban | 260—878 |
| 3,347,955 | 10/1967 | Renaudo | 260—878 |
| 3,378,607 | 4/1968 | Jones et al. | 260—878 |
| 3,454,675 | 7/1969 | Scoggin | 260—878 |
| 3,301,921 | 5/1967 | Short | 260—878 |

JOSEPH L. SCHOFER, Primary Examiner

J. C. HAIGHT, Assistant Examiner

U.S. Cl. X.R.

260—880